US005488430A

United States Patent [19]
Hong

[11] Patent Number: 5,488,430
[45] Date of Patent: Jan. 30, 1996

[54] MOTION DETECTION AND ESTIMATION APPARATUS AND METHOD THEREOF

[75] Inventor: Sung H. Hong, Seoul, Rep. of Korea

[73] Assignee: Goldstar Co., Ltd., Seoul, Rep. of Korea

[21] Appl. No.: 995,032

[22] Filed: Dec. 22, 1992

[30] Foreign Application Priority Data

Dec. 23, 1991 [KR] Rep. of Korea ................ 23998/1991

[51] Int. Cl.$^6$ .................................................. H04N 7/36
[52] U.S. Cl. ......................................... 348/699; 348/416
[58] Field of Search ................................... 348/699, 700, 348/416; H04N 7/137

[56] References Cited

U.S. PATENT DOCUMENTS

| 4,661,846 | 4/1987 | Kondo | 348/699 |
| 4,979,036 | 12/1990 | Smith | 348/700 |
| 5,027,206 | 6/1991 | Vreeswijk | 348/429 |

FOREIGN PATENT DOCUMENTS

| 0177763 | 4/1986 | European Pat. Off. | H04N 5/14 |
| 0344843 | 6/1989 | European Pat. Off. | H04N 5/14 |

*Primary Examiner*—Howard W. Britton
*Attorney, Agent, or Firm*—Fliesler, Dubb, Meyer & Lovejoy

[57] ABSTRACT

Motion detection and motion estimation apparatus and method thereof. Motion detection becomes correct by taking horizontal/vertical changes of the incoming image into account. Also, motion direction and motion magnitude are detected and motion estimation can be made. The apparatus uses horizontal/vertical difference signals as certain critical values for motion detection judgement, detects left/right motion in the horizontal direction and up/down motion in the vertical direction by performing the exclusive-OR of horizontal/vertical difference signals and frame difference signals, and makes horizontal/vertical motion estimation possible by using a ratio of horizontal/vertical signal sums and frame difference signal sums with respect to a K× 3 window.

27 Claims, 8 Drawing Sheets

Sign[TSDo] ⊕ Sign [FD]

1FRAME: 1FRAME MEMORY
τ : 1 SAMPLE MEMORY
1H : 1 LINE MEMORY
ABC : ABSOLUTE VALUE GENERATING
COMP. : COMPARING

MOTION DETECTION AND ESTIMATION APPARATUS AND METHOD THEREOF

BACKGROUND OF THE INVENTION

1. Field of the Invention

The present invention is related to image motion detection and image motion estimation, and more particularly to motion detection and estimation apparatus and method thereof for providing motion direction detection and motion estimation together with reduced motion detection error due to taking an image motion into account in both time and space axes.

2. Description of the Prior Art

Figure 1:
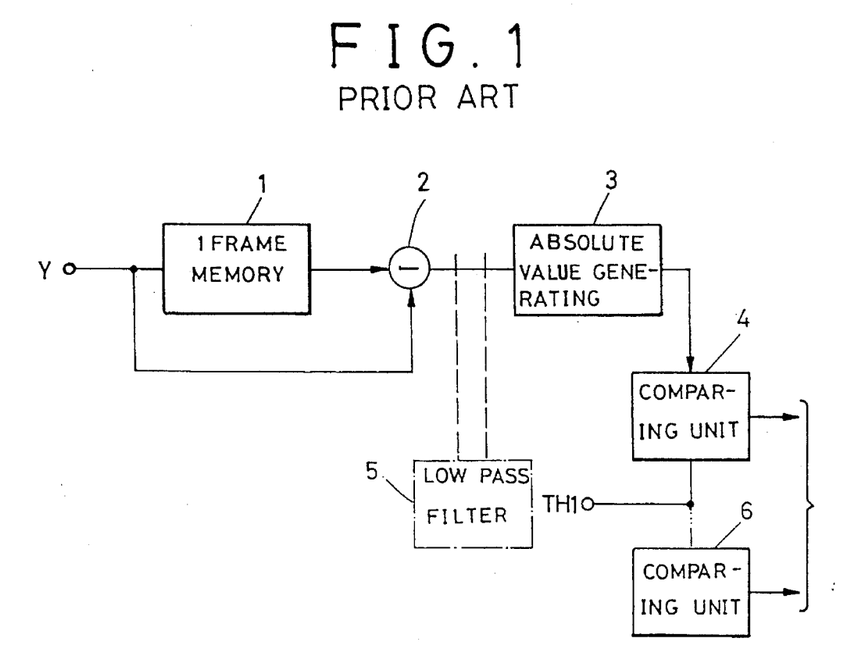
FIG. 1 shows conventional motion detection apparatus.

Conventional motion detection apparatus as shown in FIG. 1, is constituted with an 1-frame memory means 1 which generates a signal delayed by 1-frame in regard to coming image signals Y, a subtracting element 2 which performs subtraction between the coming image signals Y and the signal delayed by 1-frame in the 1-frame memory means 1, a lowpass filtering elements 5 which filters signals generated from the subtracting element 2, an absolute value generating means 3 which converts frame difference signals of the subtracting element 2 into absolute values and n comparison means 4 which generates motion detection signals by comparing certain critical values TH1-THn with the absolute values from the absolute value generating means 3.

In the above-mentioned conventional motion detection apparatus, a motion detection method is one that a decision on an image motion is made in case that a magnitude of a difference signal between a present frame and a prior frame is higher than a certain critical value or in case that a magnitude of the difference signal filtered through a lowpass filtering element is higher than a certain critical value.

The subtracting element 2 calculates 1-frame difference signals from the image signals Y delayed by 1-frame which are generated from the 1-frame memory means 1. The 1-frame difference signals are converted to absolute values by the absolute value generating means 3.

If the absolute values of 1-frame difference signals are higher than certain critical values TH1, the 1st comparison means 4 generates a high logical value 1 with judging that motions of an image region exist. If the absolute values are lower than the certain critical values TH1, the 1st comparison means 4 generates a low logical value with judging that the image region remains still.

The lowpass filtering element 5 is used for error reduction of motion detection signals caused by noise signal. The 1st to Nth comparison means detect various motion magnitudes according to their critical values TH1-THn.

Figure 2A:
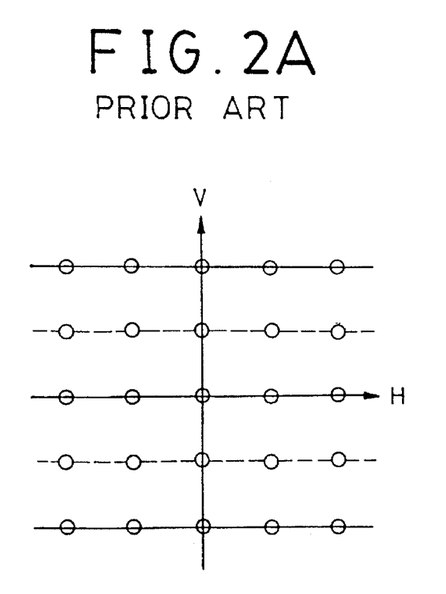
FIGS. 2A and 2B show schematic diagrams of sampling lattice of NTSC signals.
Figure 2B:
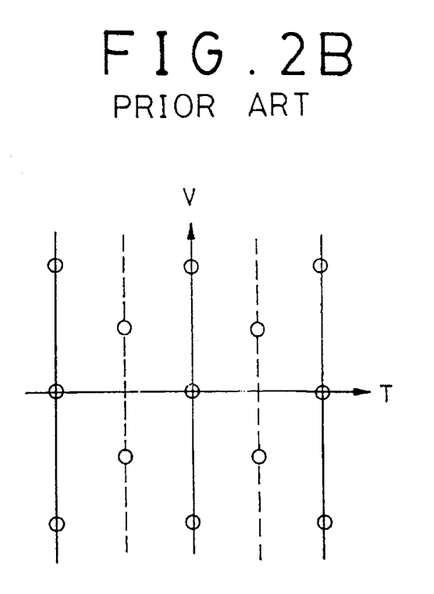

FIGS. 2A and 2B are schematic diagrams according to sampling lattice of NTSC signals of 480 active lines in a conventional image motion detection method.

Figure 3A:
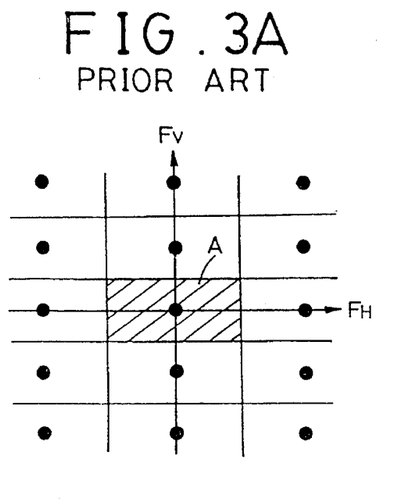
FIGS. 3A and 3B are schematic diagrams of Nyquist regions shown in FIGS. 2A and 2B.
Figure 3B:
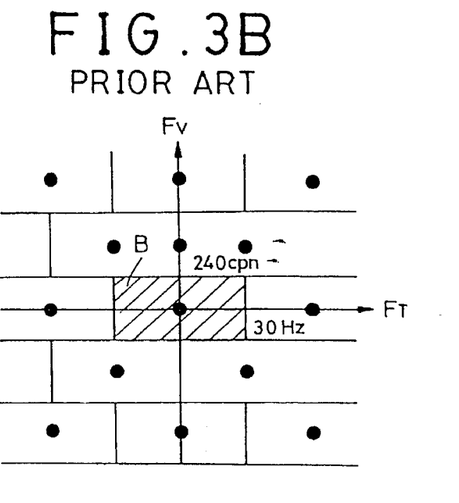

FIGS. 3A and 3B show Nyquist regions of baseband signals, which are shaded portions A and B. If an image motion in both horizontal/vertical directions and times axes still exists in the Nyquist region, it is judged that the image motion is not occurred in such directions.

Figure 4A:
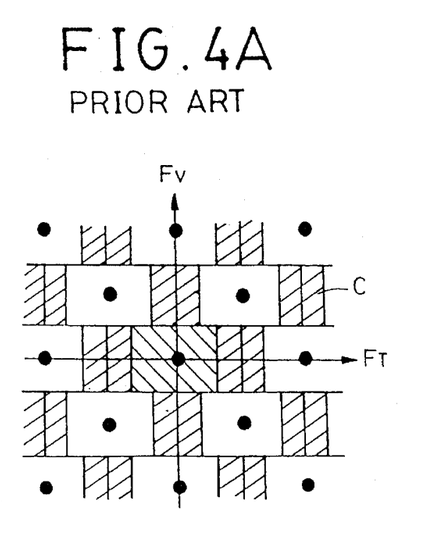
FIGS. 4A and 4B show schematic diagrams of spectrum aliasing phenomenon according to image motions.

As shown in FIG. 4A, in case that a signal change in the time axis is larger than a certain level and aliasing C between spectrums occurs, it is judged that an image motion occurs.

Figure 4B:
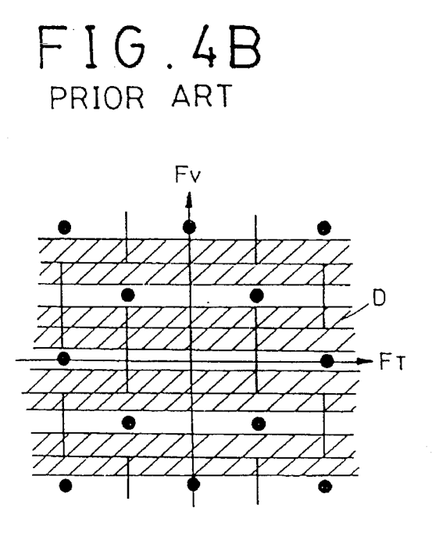

However, in case that a large image motion in the vertical direction occurs with a signal change in the axis less than a certain level, it is judged that an image motion occurs by a frequency aliasing component D in the vertical direction as shown in FIG. 4B. This phenomenon is also applied to the horizontal direction.

The conventional image motion detection method which takes only an image motion in the time axis into account without any consideration of its motion in space does not detect motion directions. And also, the conventional method has a problem of a poor accuracy in detecting image motion magnitudes. That is, an image region with a small image motion magnitude in space is judged as that with a large image motion magnitude or vice versa.

SUMMARY OF THE INVENTION

The present invention is related to motion detection and estimation apparatus and method thereof for performing accurate motion detection or motion magnitude detection, motion direction judgement and motion magnitude estimation in order to solve the above-mentioned problems of the prior art.

The present invention can be used for signal processing such as scan line interpolation and field rate increase; enhancement when using a function of motion direction detection of the present invention; and luminance/chromaticity separation and video data compression, etc.

The present invention can perform more accurate motion detection than the prior art through its motion detection apparatus since horizontal and vertical image motion rates are taken into account, and detect motion direction of an article in an image motion region through a function of its motion direction detection, whereas a motion detection means of the prior art has not a function of motion direction detection.

The present invention also provides both functions of judgement on whether or not a motion exists and motion magnitude measurement.

The present invention also provides a simple method of motion estimation in a K×3 search region through its motion estimation means whose vertical and horizontal search regions can be respectively expanded by increasing K-sample memory and line memory in number.

The motion detection apparatus of the present invention is composed of a motion region detection means which compares frame difference signal absolute values with certain critical values, compares the frame difference signal absolute values with absolute values of horizontal/vertical signal sums with respect to incoming signals and 1-frame-delayed signals, judges as a stillness region if the frame difference signals are less with certain critical values in all the comparisons, and judges as a motion region if not;

a motion direction detection means which performs an exclusive OR of both the frame difference signal sign bits and horizontal/vertical difference signals, and detects a motion direction MD with respect to horizontal directions (left, right) and horizontal directions (up, down); and a motion magnitude detection means which detects a horizontal motion magnitude MM by a ratio of frame difference signal absolute value sums and horizontal difference signal absolute value sums with respect to window of sample and line memory numbers, and detects a vertical motion magnitude MM by a ratio of frame difference signal absolute value sums.

A motion estimation for a horizontal motion dx and a vertical motion dy are accomplished as follows.

That is, absolute values of vertical/horizontal difference signal sums with respect to 3 lines and sums of vertical/ horizontal difference signal absolute values in regard to a K×3 window are respectively generated by accumulating element and K-sample memory. Frame difference signals with respect to the 3 lines are multiplied by horizontal/vertical difference signal sign bits with respect to the 3 lines. And then, sums of multiplications of the frame difference signals and horizontal/vertical difference signal sign bits in regard to the K×3 window is generated by accumulating element and K-sample memory for horizontal/vertical motion estimations.

The present invention uses horizontal and vertical signals of an image as critical values for a motion detection judgement. The present invention detects horizontal motion direction (left, right) and vertical motion directions (up, down) by a result of exclusive OR of horizontal/vertical difference signals and frame difference signals. The present invention takes into account image motions (horizontal and vertical) in space by using a ratio of horizontal/vertical difference signal sums and frame difference signal sums with respect to the K×3 window.

DETAILED DESCRIPTION OF THE PREFERRED EMBODIMENTS

The present invention will be described below in detail through preferred embodiments with reference to attached drawings.

Figure 5:
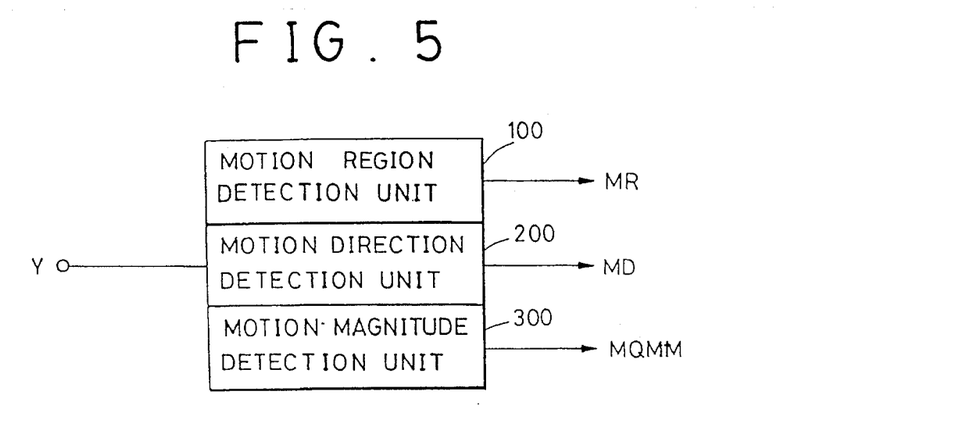
FIG. 5 shows a schematic diagram of motion detection apparatus according to the present invention.

FIG. 5 shows a schematic diagram of motion detection apparatus according to the present invention.

As shown in FIG. 5, the motion detection apparatus according to the present invention is constituted with a motion region detection means 100 which compares frame difference signal absolute values with certain critical values, compares the frame difference signal absolute values with absolute values of horizontal/vertical signal sums with respect to incoming signals and 1 frame-delayed signals of the incoming signals, judges as a stillness region if the frame difference signals are less in all the comparisons, and judges as a motion region MR if not; a motion direction detection means 200 which performs an exclusive OR of the frame difference signal sign bits and horizontal difference signals or vertical difference signals, and detects a motion direction MD with respect to horizontal directions (left, right) and horizontal directions (up, down); and a motion magnitude detection means 300 which detects horizontal motion magnitudes MM by ratios of sums of frame difference signal absolute values and sums of horizontal difference signal absolute values with respect to window of sample and line memory numbers, and detects vertical motion magnitudes MM by ratios of sums of frame difference signal absolute values and sums of vertical difference signal absolute values.

Figure 7:
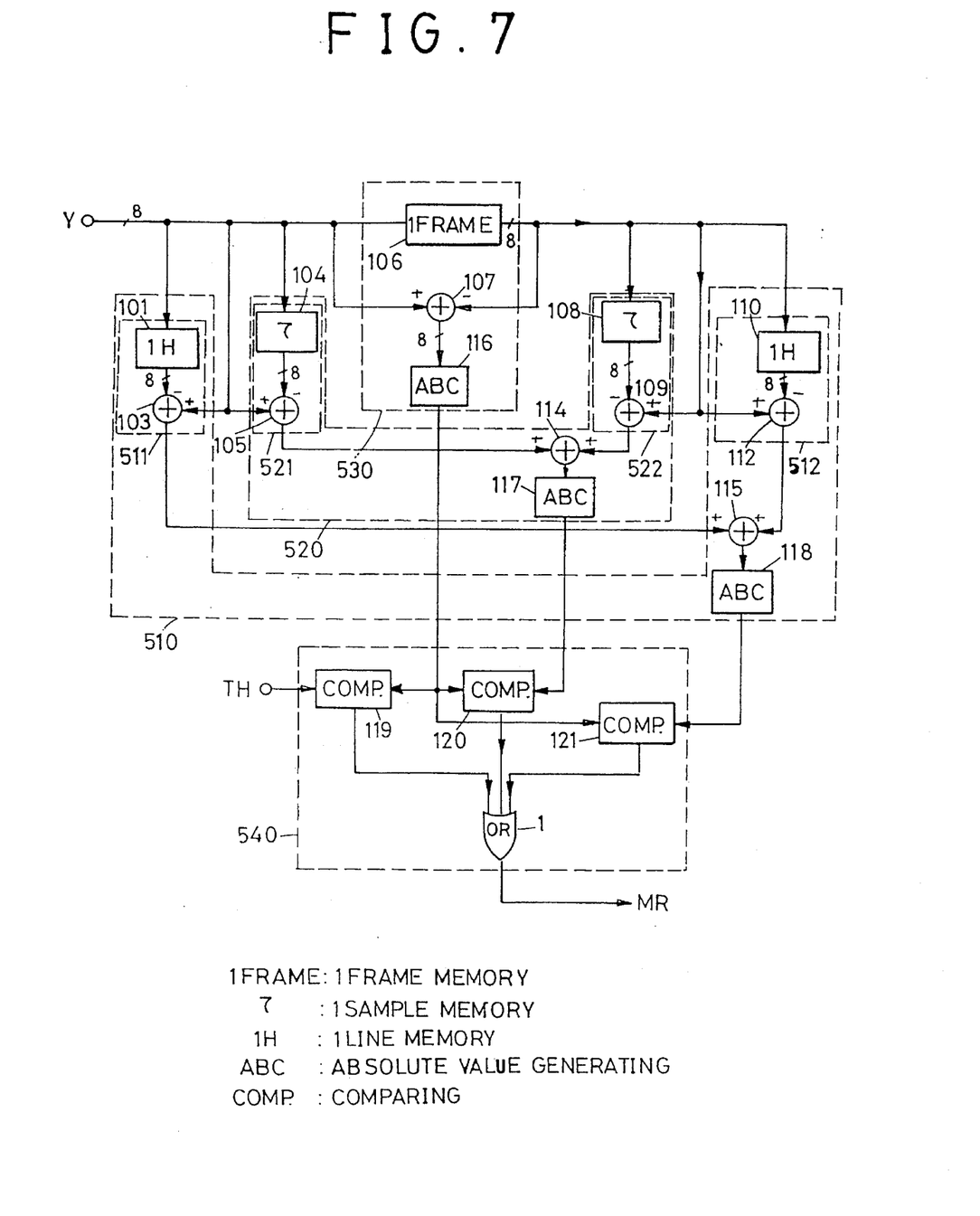
FIG. 7 is a detailed block diagram for motion region detection means shown in FIG. 5.

FIG. 7 is a detailed block diagram for motion region detection means shown in FIG. 5.

As shown in FIG. 7, the motion region detection means is constituted with a interframe vertical difference signal absolute value generating section 510 which composes vertical difference signals with respect to incoming image signals Y and 1 frame-delayed image signals of the incoming image signals Y in order to convert the composed ones to absolute values; a interframe horizontal difference signal absolute value generating section 520 which composes horizontal difference signals with respect to incoming image signals Y and 1 frame-delayed image signals of the incoming image signals Y in order to convert the composed ones to absolute values; a frame difference signal absolute value generating section 530 which obtains frame difference signals with respect to incoming image signals Y and converts the obtained signals to absolute values; and a motion region judging section 540 which compares the frame difference signals absolute values with certain critical values, compares the frame difference signals absolute values with absolute values of horizontal/vertical difference signal sums and judges whether or not motions exist.

The interframe vertical difference signal absolute value generating section 510 is constituted with a 1st vertical difference signal generating element 511 which generates vertical difference signals with respect to incoming image signals Y; a 2nd vertical difference signal generating element 512 which generates vertical difference signals with respect to 1 frame-delayed image signals; an adding element 115 which adds signals from the 1st vertical difference signal generating element 511 and the 2nd vertical difference signal generating element 512; and an absolute value generating element 118 which generates absolute values of the composed signals.

The interframe horizontal difference signal absolute value generating section 520 is constituted with a 1st horizontal difference signal generating element 521 which generates horizontal difference signals with respect to incoming image signals Y; a 2nd horizontal difference signal generating element 522 which generates horizontal difference signals with respect to 1 frame-delayed image signals; an adding element 114 which adds signals from the 1st and 2nd horizontal difference signal generating element 521, 522; and an absolute value generating element 118 which generates absolute values of the added signals.

The motion region judging section 540 is constituted with a 1st comparing element 119 which compares outputs of the frame difference signal absolute value generating section 530 with certain critical values TH; a 2nd comparing dement 121 which compares the frame difference signal absolute values with outputs of the interframe vertical difference signal absolute value generating section 510; a 3rd comparing element 120 which compares outputs of the interframe horizontal difference signal absolute value generating section 520 with outputs of the frame difference signal absolute value generating section 530; and an OR gate element which ORs outputs of the 1st, 2nd and 3rd comparing elements 119, 120, 121.

The frame difference signal absolute value generating section 530 is constituted with a frame difference signal generating element 531 which generates 1-frame difference signal with respect to incoming image signals Y; and an absolute value generating element 116 which generates the frame difference signal absolute values.

The frame difference signal generating element 531 is constituted with a 1-frame memory element which delays incoming image signals by 1 frame; and a subtracting element which performs a subtraction with the incoming image signals Y.

The vertical difference signal generating element is constituted with a 1-line memory element which delays respectively incoming image signals by 1 line; and a subtracting element which generates differences between output image signals of the 1-line memory and incoming image signals Y.

The horizontal difference signal generating element is constituted with a 1-sample memory element which delays incoming image signals Y by 1 sample; and a subtracting element which generates differences between image signals of the 1-sample memory element and the incoming image signals Y.

Figure 8:
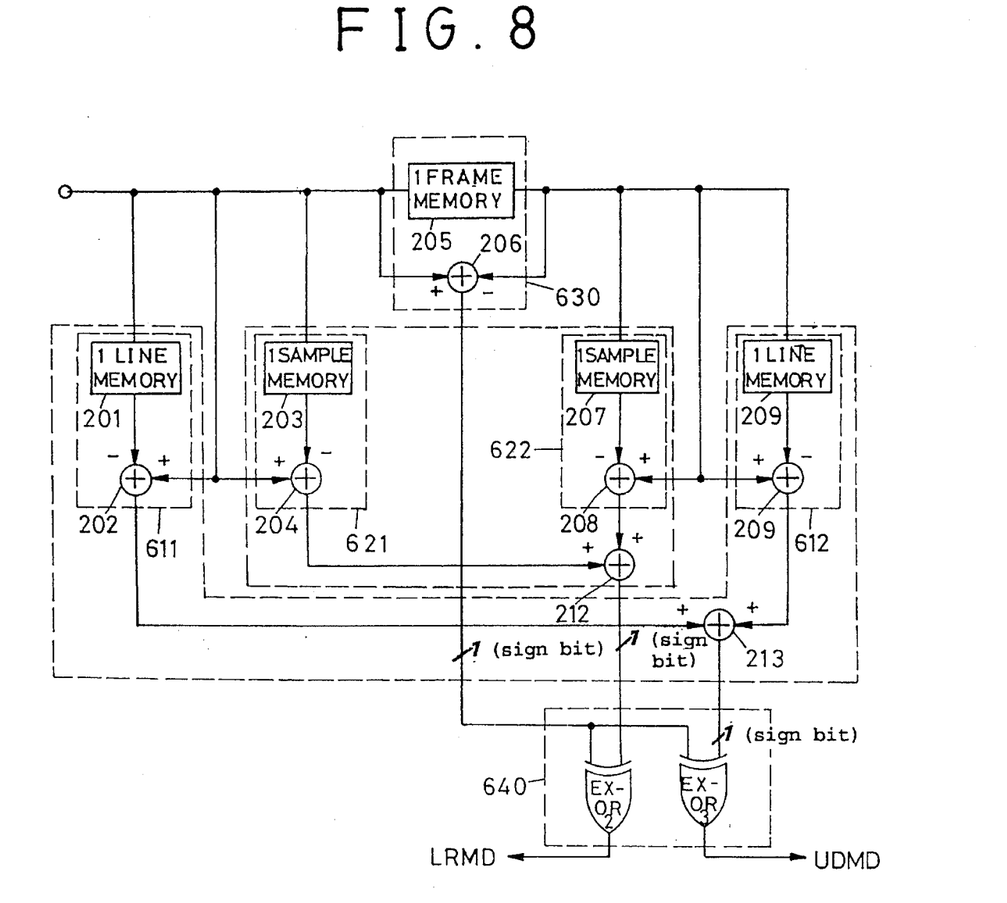
FIG. 8 is a detailed block diagram for motion direction detection means shown in FIG. 5.

FIG. 8 is a detailed block diagram for motion direction detection means shown in FIG. 5.

As shown in FIG. 8, the motion direction detection means 200 is constituted with an interframe vertical difference signal generating section 610 which composes vertical difference signals with respect to incoming image signals Y and 1 frame-delayed image signals respectively; a interframe horizontal difference signal generating section 620 which composes horizontal difference signals with respect to incoming image signals Y and 1 frame-delayed image signals respectively; a frame difference signal generating section 630 which obtains frame difference signals with respect to incoming image signals Y; a motion direction judging section 640 which performs an exclusive OR of outputs from the frame difference signal generating section 630, interframe vertical difference signal generating section 610 and interframe horizontal difference signal generating section 620 and judges whether or not motions in up, down, left and right directions exist.

The interframe vertical difference signal generating section 610 is constituted with a 1st vertical difference signal generating element 611 which generates vertical difference signals with respect to incoming image signals Y; a 2nd vertical difference signal generating element 612 which generates vertical difference signals with respect to 1 frame-delayed signals; an adding element 213 which composes signals from the 1st ad 2nd vertical difference signal generating elements 612, 612.

The interframe horizontal difference signal generating section element 620 is constituted with a 1st horizontal difference signal generating element 621 which generates horizontal difference signals with respect to incoming image signals Y; a 2nd horizontal difference signal generating element 622 which generates horizontal difference signals with respect to 1 frame-delayed signals; an adding element 212 which adds signals from the 1st and 2nd horizontal difference signal generating elements, 621, 622.

The motion direction judging section 640 is constituted with an exclusive OR gate element EX-OR2 which performs an exclusive OR of outputs from the 1 frame difference signal generating section 630 and the interframe horizontal difference signal generating section 620 and judges whether or not motions in left and right directions exist; and an exclusive OR gate element EX-OR3 which performs an exclusive OR of outputs from the 1 frame difference signal generating section 630 and the interframe horizontal difference signal generating section 620 and judges whether or not motions in up and down directions exist.

Figure 9:
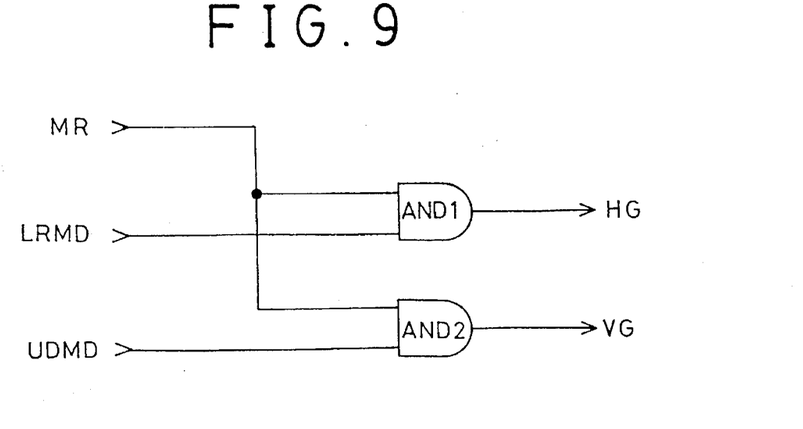
FIG. 9 shows a logic diagram for a function of motion direction detection in motion detection apparatus according to the present invention.

FIG. 9 shows a logic diagram for a function of motion direction detection in motion apparatus according to the present invention.

As shown in FIG. 9, the motion detection apparatus is constituted with AND gates AND1, AND2 which respectively ANDs motion region detection signals MR of the motion region detection means 100 with left/right motion direction detection signals LRMD and up/down motion direction detection signals UDMD from the motion direction detection means 200, and generates information on horizontal and vertical motions HG, VG.

Figure 10:
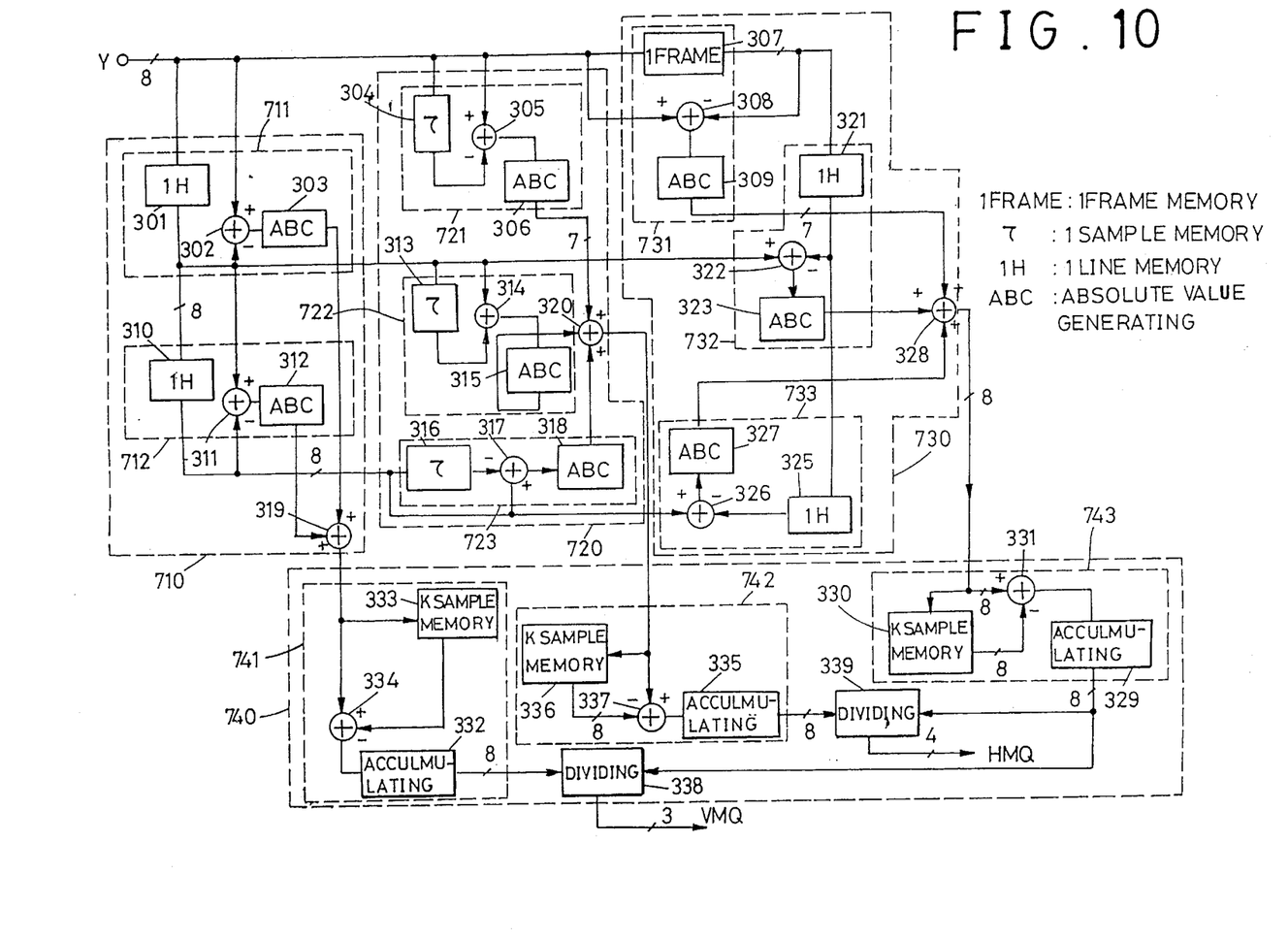
FIG. 10 is a detailed block diagram for motion magnitude detection means shown in FIG. 5.

FIG. 10 is a detailed block diagram for motion magnitude detection means shown in FIG. 5.

As shown in FIG. 10, the motion magnitude detection means 300 is constituted with a vertical difference signal absolute value generating section 710 which generates vertical difference signal absolute values with respect to 1 line-delayed signals and 2 line-delayed signals of incoming image signals Y and adds the absolute values; a horizontal difference signal absolute value generating section 720 which generates horizontal difference signal absolute values with respect to 1 sample-delayed signals and 2 line-delayed signals of incoming image signals Y and adds the absolute values; a frame difference signal generating section 730 which obtains frame difference signals with respect to 1 line-delayed signals and 2 line-delayed signals of incoming image signals Y; a sample accumulating section 740 which detects motion magnitudes by ratios of accumulated signals of vertical/horizontal difference signal absolute values with respect to a K×N window and accumulated signals of frame difference signal absolute values with inputs from the vertical difference signal absolute value generating section 710, horizontal difference signal absolute value generating section 720 and frame difference signal generating section 730.

The vertical difference signal absolute value generating section 710 is constituted with a 1st vertical difference signal absolute value generating element 711 which generates vertical difference signal absolute values with respect to incoming image signals Y; a 2nd vertical difference signal absolute value generating element 712 which generates vertical difference signal absolute values with respect to 1 line-delayed signals of incoming image signals Y; an adding element 310 which adds outputs of the 1st and 2nd vertical difference signal absolute value generating elements 711, 712.

The horizontal difference signal absolute value generating section 720 is constituted with a 1st horizontal difference signal absolute value generating element 721 which generates horizontal difference signal absolute values with respect to incoming image signals Y; a 2nd horizontal difference signal absolute value generating element 722 which generates horizontal difference signal absolute values with respect to 1 line-delayed signals of incoming image signals Y; a 3rd horizontal difference signal absolute value generating element 723 which generates horizontal difference signal absolute values with respect to 2 line-delayed signals of incoming image signals Y; an adding element 320 which adds outputs of the 1st, 2nd and 3rd horizontal difference signal absolute value generating elements 721,722, 723 and generates signals to the sample accumulating element 320.

The frame difference signal generating section 730 is constituted with a frame difference signal absolute value generating element 731 which generates 1 frame difference signal absolute values; a 1st interframe vertical difference signal absolute value generating element 732 which generates differences between 1 line-delayed signals and 1 frame/1 line-delayed signals with respect to incoming image signals and obtains absolute values of the differences; a 2nd interframe vertical difference signal absolute value generating element 733 which generates differences between 2 line-delayed signals and 1 frame/2 line-delayed signals with respect to incoming image signals and obtains absolute values of the differences; and an adding element 328 which adds outputs of the frame difference signal absolute value generating element 731, 1st and 2nd interframe vertical difference signal absolute value generating elements 732, 733 and generates the result to the sample accumulating section 740.

The sample accumulating section 740 is constituted with a 1st sample accumulating element 741 which accumulates outputs of the vertical difference signal absolute value generating section 710 by k samples; a 2nd sample accumulating element 742 which accumulates outputs of the horizontal difference signal absolute value generating section 720 by k samples; a 3rd sample accumulating element 743 which accumulates outputs of the frame difference signal generating section 730 by k samples; an dividing element 339 which divides outputs of the 2nd sample accumulating element 742 by outputs of the 3rd sample accumulating element 743 and detects horizontal motion magnitudes; and an dividing element 338 which divides outputs of the 1st sample accumulating 741 by outputs of the 3rd sample accumulating element 743 and detects vertical motion magnitudes.

The vertical difference signal absolute value generating elements are respectively constituted with vertical difference signal generating elements and absolute value generating elements which convert outputs of the vertical difference signal generating elements to absolute values.

The horizontal difference signal absolute value generating elements are respectively constituted with horizontal difference signal generating elements and absolute value generating elements which convert outputs of the horizontal difference signal generating elements to absolute values.

The interframe vertical difference signal absolute value generating elements are respectively constituted with a 1 line memory element which delays 1 frame-delayed signals by 1 line; an adding element which adds incoming image signals delayed by 1 line and 1 frame image signals; and an absolute value generating element which generates outputs of the adding element to absolute values.

The sample accumulating elements are respectively constituted with a k sample memory element which delays incoming signals by k samples; a subtracting element r which generates differences between the incoming signals and the k sample-delayed signals; and an accumulating element which accumulates outputs of the subtracting element by k samples.

Figure 11:
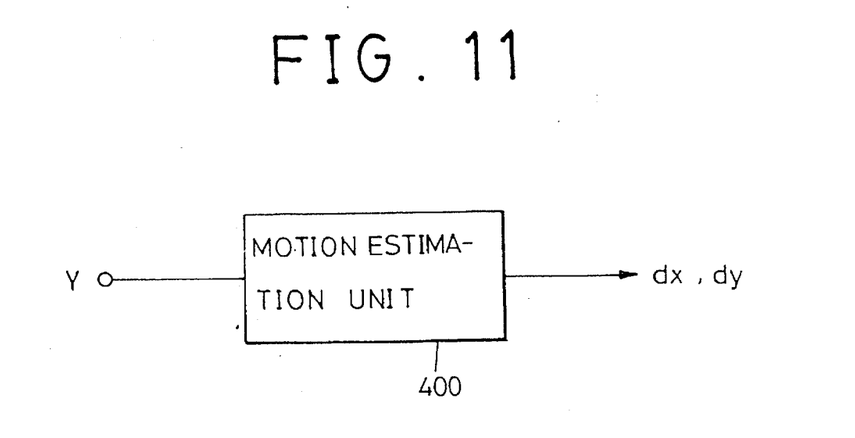
FIG. 11 shows a block diagram for motion estimation apparatus according to the present invention.

FIG. 11 shows a block diagram for motion estimation apparatus according to the present invention.

As shown in FIG. 11, the motion estimation apparatus is constituted with a motion estimation means which estimates a horizontal motion dx (motion magnitude +motion direction) by ratios of sums of multiplications of frame difference signals and horizontal difference signal signs and sums of horizontal difference signal absolute values, and estimates vertical motions dy by ratios of sums of multiplications of frame difference signals and vertical difference signal signs and sums of vertical difference signal absolute values.

Figure 12:
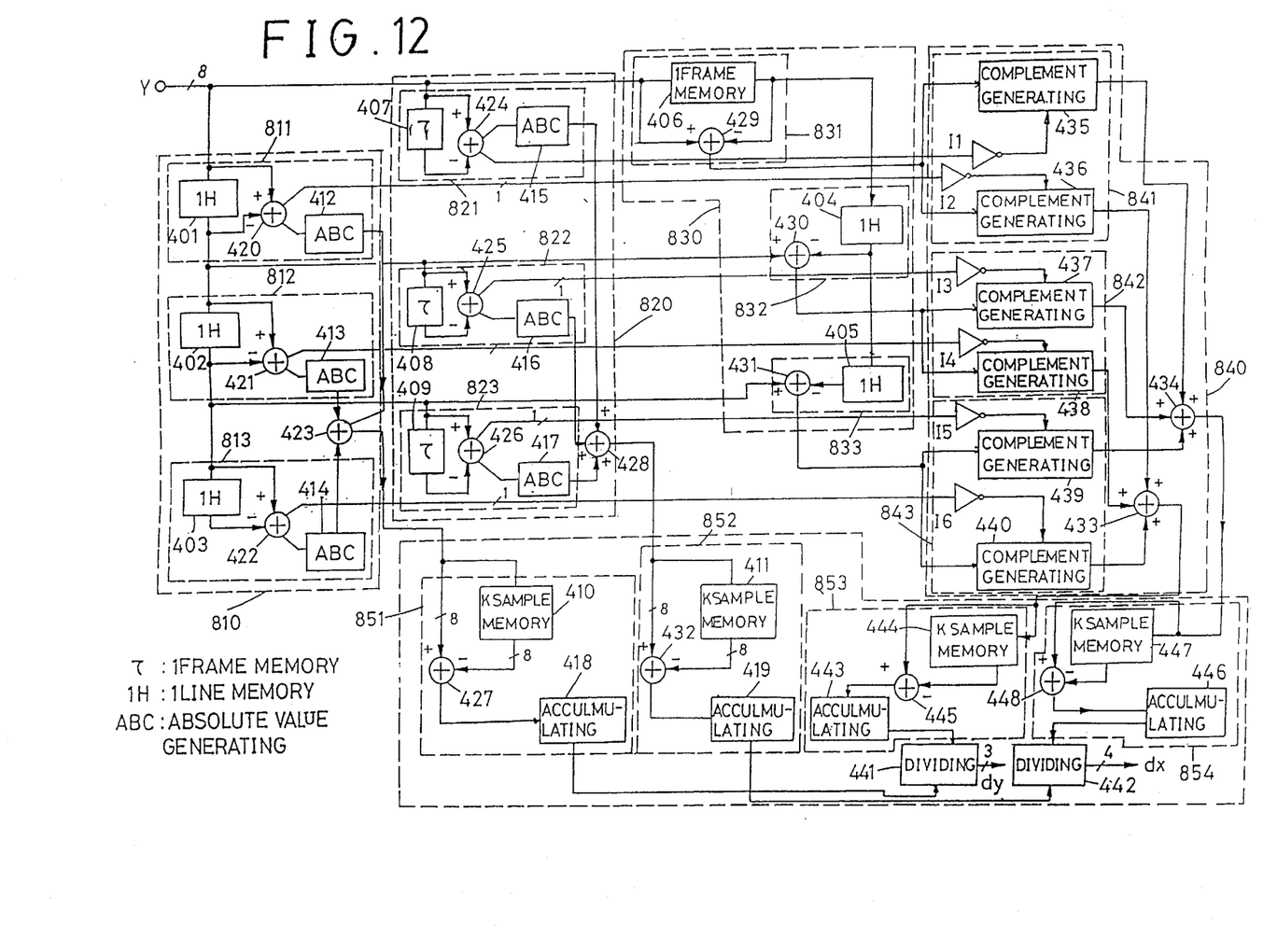
FIG. 12 is a detailed block diagram for motion estimation apparatus shown in FIG. 11.

FIG. 12 is a detailed block diagram for motion estimation apparatus shown in FIG. 11.

As shown in FIG. 11, the motion estimation apparatus 400 is constituted with a vertical difference estimation signal absolute value generating means 810 which generates vertical difference signal absolute values with respect to incoming image signals Y and 1 line/2 line-delayed signals and adds the absolute values respectively; a horizontal difference estimation signal absolute value generating means 820 which generates horizontal difference signal absolute values with respect to incoming image signals Y and 1 line/2 line-delayed signals and adds the absolute values; a frame difference correction signal genesting means 830 which respectively generates difference signals with respect to incoming image signals Y, 1 frame/1 line-delayed signals and 1 frame/2 line-delayed signals; an estimation signal complement generating means 840 which checks sign bits of outputs of the vertical difference estimation signal absolute value genesting means 810, horizontal difference estimation signal absolute value genesting means 820 and frame difference correction signal genesting means 830; and an estimation value calculating means 850 which accumulates outputs of the vertical difference estimation signal absolute value generating means 810, horizontal difference estimation signal absolute value generating means 820 and frame difference correction signal generating means 830 by k samples with respect to a K×3 window and detects motions.

The vertical difference estimation signal absolute value generating means 810 is constituted with a 1st vertical difference signal absolute value generating section 811 which generates vertical difference signal absolute values with respect to incoming image signals Y; a 2nd vertical difference signal absolute value generating section 812 which generates vertical difference signal absolute values with respect to 1 line-delayed signals of incoming image signals Y; a 3rd vertical difference signal absolute value generating section 813 which generates vertical difference signal absolute values with respect to 2 line-delayed signals of incoming image signals Y; and an adding element which adds the 1st, 2nd and 3rd vertical difference signal absolute values.

The horizontal difference estimation signal absolute value generating means 820 is constituted with a 1st horizontal difference signal absolute value generating section 821 which generates horizontal difference signal absolute values with respect to incoming image signals Y; a 2nd horizontal difference signal absolute value generating section 822 which generates horizontal difference signal absolute values with respect to 1 line-delayed signals of incoming image signals Y; a 3rd horizontal difference signal absolute value generating section 823 which generates horizontal difference signal absolute values with respect to 2 line-delayed signals of incoming image signals Y; and an adding element 428 which adds outputs of the 1st, 2nd and 3rd horizontal difference signal absolute value generating elements 821, 822, 823.

The frame difference correction signal generating means 830 is constituted with a frame difference signal absolute value generating section 831 which generates 1 frame difference signal absolute values with respect to incoming image signals Y; a 1st interframe vertical difference signal generating section 832 which generates differences between 1 line-delayed signals and 1 frame/1 line-delayed signals with respect to incoming image signals; a 2nd interframe vertical difference signal generating section 833 which generates differences between 2 line-delayed signals and 1 frame/2 line-delayed signals with respect to incoming image signals and obtains absolute values of the differences.

The estimation signal complement generating means 840 is constituted with a 1st complement generating section 841 which generates sign bits of the 1st horizontal difference signals and the 2nd vertical difference signals; a 2nd complement generating section 842 which generates sign bits of the 2nd horizontal difference signals and the 2nd vertical difference signals; a 3rd complement generating section 843 which generates sign bits of the 3rd complement generating section 843 which generates sign bits of the 3rd horizontal difference signals and the 3rd vertical difference signals; and adding elements 433, 434 which adds the outputs of the 1st, 2nd and 3rd complement generating section 841,842, 843.

The complement generating section are respectively constituted with an inverting element which inverts horizontal difference signal signs; a 1st complement generating element which generates complements according to outputs of the inverting element and the frame difference signals; and a 2nd complement generating element which generates complements according to outputs of the inverting element, the frame difference signals and the inverting element which inverts the vertical difference signals signs.

The estimation value calculating means 850 is constituted with a 1st sample accumulating section 851 which accumulates outputs of the vertical difference estimation signal absolute value generating means 810 by k samples; a 2nd sample accumulating section 852 which accumulates outputs of the horizontal difference estimation signal absolute value generating means 820 by k samples; a 3rd sample accumulating section 853 which accumulates sums of multiplications of vertical difference signal signs and frame difference signals by k samples; a 1st sample accumulating section 854 which accumulates sums of multiplications of horizontal difference signal signs and frame difference signals by k samples; a dividing element 441 which estimates vertical motion dy by ratios of sums of multiplications of frame difference signals and vertical difference signal signs from the 3rd sample accumulating section 853 and sums of vertical difference signal absolute values from the 1st sample accumulating section 851; and a dividing element 442 which estimates horizontal motions dy by ratios of sums of multiplications of frame difference signals and horizontal difference signal signs from the 4th sample accumulating section 854 and sums of horizontal difference signal absolute values from the 2nd sample accumulating section 852.

Operations and effects of the present invention with the above-mentioned constitution will be described below in detail with reference to drawings from FIG. 5 to FIG. 12.

Figure 6A:
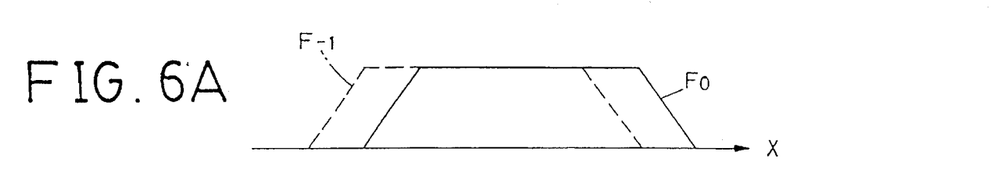
FIGS. 6A to 6E show waveforms illustrating motion direction detection when motions occur according to the present invention.
Figure 6B:
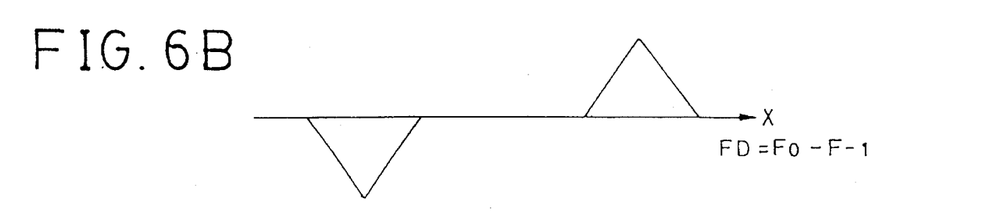
Figure 6C:
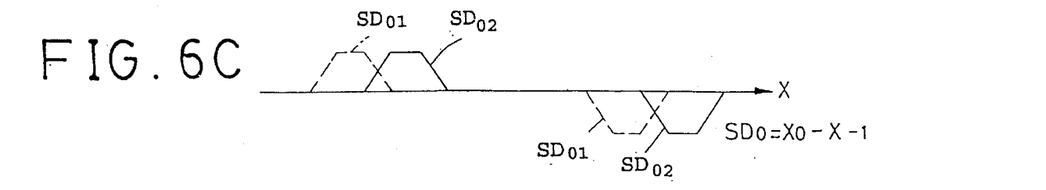

FIGS. 6A to 6E show motion direction detection when a motion occurs according to the present invention. In case that a motion occurs to the right as shown in FIG. 6A, frame difference signals FD, present frame FO - prior frame F-1 appear as shown in FIG. 6B, and pixel difference signals SDo, present pixel Xo - prior pixel X-1 in space region appear as shown in FIG. 6C.

Figure 6D:
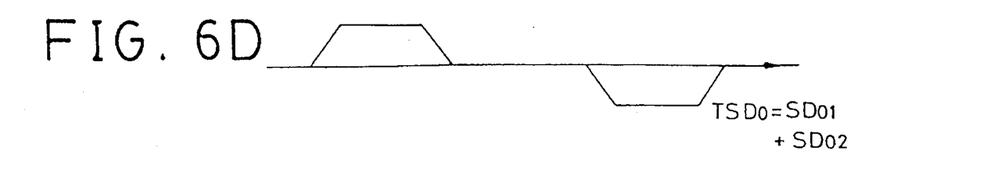
Figure 6E:
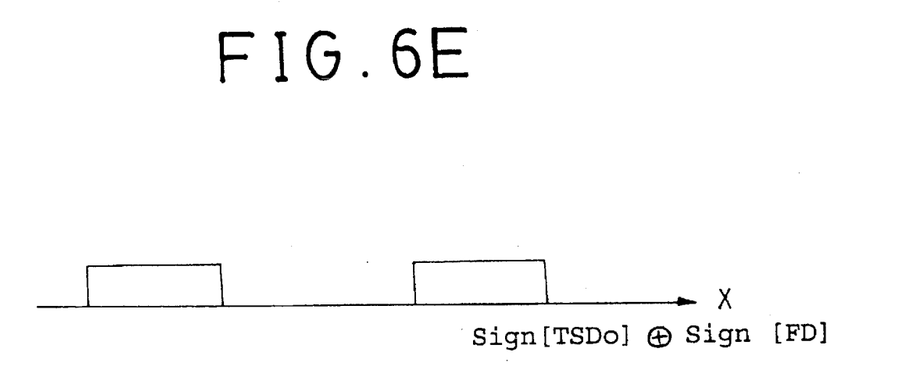

According to the above-mentioned, sum signals TSDo of pixel difference signals SDo1 in prior frame and pixel difference signals SDo2 in present frame appear as shown in FIG. 6D, an output of exclusive OR of sum signals TDSo of pixel differences in the present and prior frames and frame difference signals FD appears as shown in FIG. 6E.

Therefore, it is indicated that a motion to the right occurs in case that the exclusive OR output of the pixel difference signals TDSo and frame difference signals FD in a motion region goes to a logic 1, while it is indicated that a motion to the left occurs in case that the exclusive OR output goes to a logic 0.

Such a motion detection method will be described below in detail with respect to FIG. 7.

Input signals are delayed by 1 line in 1 line memory element 101 and vertical direction difference signals are generated from a subtracting element 103. And also, image signals are delayed by 1 sample in 1 sample memory element 104 and horizontal direction difference signals are generated from a subtracting element 105. 1 frame-delayed signals are produced from 1 frame memory element 106 and 1 frame difference signals are out of a subtracting element 107.

And, horizontal difference signals with respect to input signals and horizontal difference signals with respect to 1 frame-delayed signals are added by an adding element 114, the added signals are converted to absolute values through an absolute value generating element 117. Vertical difference signals and 1 frame-delayed signals with respect to incoming signals are also added by an adding element 115 and added signals are converted to absolute values through absolute value generating element 118.

Absolute values to which frame difference signals of the subtracting element 107 are converted through an absolute value generating element 116 are compared with certain critical values and absolute values of horizontal and vertical difference signals sums in respective comparing elements 119–121. If at least one of the comparing elements 119–121 has logic 1 outputs, it is judged that motions exist. If not, it is judged that motion does not exist.

FIG. 8 is a detailed block diagram for motion direction detection means shown in FIG. 5.

Here, vertical difference signals of a subtracting element 202 regarding input signals and vertical difference signals of a subtracting element 210 regarding 1 frame-delayed signals are added by an adding element 213. Horizontal difference signals of a subtracting element 204 regarding input signals and vertical difference signals of a subtracting element 208 regarding 1 frame-delayed signals are added by an adding element 212. And sign bits are decided for signals of respective adding elements 212, 213.

A value obtained from exclusive-OR gate element EX-OR2 of frame difference signal sign bits which are obtained from subtracting element 206 and sign bits of outputs of the adding element 212 is a detection signal which indicates a horizontal motion direction, i.e., left and fight motion directions LRMD. It is indicated that a motion occurs to the right if the value is a logic 1, and it is indicated that a motion occurs to the left if the value is a logic 0.

And also, a value obtained from exclusive-OR gate element EX-OR3 of frame difference signal sign bits and sign bits of outputs of the adding element 213 is a detection signal which indicates a vertical motion direction, i.e., up and down motion directions UDMD. It is indicated that a motion occurs to the down direction if the value is a logic 1, and it is indicated that a motion occurs to the up direction if the value is a logic 0.

FIG. 9 shows a logic diagram for a function of motion direction detection in motion detection apparatus according to the present invention. This FIG. 9 also shows a motion detection method that FIG. 7 and FIG. 8 are integrated. A result that a motion region MR detection signal and a left/right motion direction LRMD detection signal are ANDed through AND gate AND 1 indicates information HG on a horizontal motion, and a result that a motion region MR detection signal and a up/down motion direction UDMD detection signal are ANDed through AND gate AND2 indicates information VG on a vertical motion.

FIG. 10 is a detailed block diagram for motion magnitude detection means shown in FIG. 5.

As shown in FIG. 10, vertical and horizontal difference signals are generated through a 1 line memory element 301 and a subtracting element 302 and through a 1 sample memory 304 and a subtractor 305, and the vertical and horizontal difference signals are converted to absolute values through absolute value generating elements 303, 306. 1 line-delayed signals are generated through a 1 line memory element 310 and a subtracting element 311 and through a 1 sample memory element 313 and a subtracting element 314, and the vertical and horizontal difference signals are converted to absolute values through absolute value generating element 312, 315. 2 line-delayed signals are converted to horizontal difference signals through a 1 sample memory element 316 and a subtracting element 317, and the horizontal difference signals are converted to absolute values through absolute value generating element 318. And also, 1 frame-delayed signals from a 1 frame memory element 307 are combined with 1 line-delayed signals through a 1 line memory element 321 and a subtracting element 322, and the combined signals are converted to absolute values through an absolute value generating 323. 1 frame/2 line-delayed signals through a 1 line memory element 325 and a subtracting element 326 with which 2 line-delayed signals are combined are converted to absolute values through an absolute value generating element 327. Input signals are generated as frame difference signals through a 1 frame memory element 307 and a subtracting element 308 which are converted to absolute values through an absolute value generating element 309.

Accordingly, sum signals of vertical direction difference signal absolute values from an adding element 319 contain ones which are accumulated by k samples of sum signals of vertical direction difference signal absolute values with respect to a K×2 window through the accumulating element 332, subtracting element 334 and k sample memory element 333. Sum signals of horizontal direction difference signal absolute values from an adding element 320 contain ones which are accumulated by k sample of sum signals of horizontal direction difference signal absolute values with respect to a K×3 window through the accumulating element 335, subtracting element 337 and k sample memory element 336. Also, sum signals of frame difference signal absolute values from an adding element 328 contain ones which are accumulated by k samples of sum signals of frame difference signal absolute values with respect to a K×3 window through the accumulating element 329, adding element 331 and k sample memory element 330.

Therefore, magnitudes as below are detected through respective dividing elements 338, 339. That is, Vertical motion magnitude $VMM =$ -continued $$\text{Horizontal motion magnitude } HMM = \frac{\sum_{K \times 3} |\text{frame difference signal}|}{\sum_{K \times 2} |\text{vertical difference signal}|}$$

$$= \frac{\sum_{K \times 3} |\text{Frame difference signal}|}{\sum_{K \times 3} |\text{horizontal difference signal}|}$$

Here, a value over 5 or 7 are to be chosen for the K value in case of T.V. image signals since horizontal motion magnitudes are larger than vertical ones. And expanded vertical detection region can be accomplished with increased sample memory number in k sample memory elements 330, 333, 336.

FIG. 12 is a detailed block diagram for motion estimation apparatus shown in FIG. 11.

Here, input signals are converted to vertical difference signals by sequential processing through 1 line memory elements 401–403 and subtracting elements 420–422. The vertical difference signals are converted through absolute value generating elements 412–414 and then the converted vertical difference signals become absolute values of vertical difference signal sums with respect to 3 lines through adding element 423. Input signals are converted through 1 line memory elements 401, 402, 1 sample memory elements 407–409 and subtracting elements 424–426 to horizontal difference signals whose absolute values are generated by absolute value generating elements 415–417. Absolute values of horizontal difference signal sums with respect to 3 line are generated through adding elements 428. Sums of vertical and horizontal difference signal absolute values regarding a K×3 window are generated through accumulating elements 418, 419, k sample memory elements 410, 411 and adding elements 427, 432.

And also, frame difference signals of subtracting elements 429–431 are multiplied in respective complement generating elements 435–440 by horizontal and vertical difference signals sign bits concerning 3 lines of subtracting elements (424, 420) (425, 421), (426, 422) through respective inverting elements I1-I6. Signals from adding elements 433, 434 are processed through accumulating elements 445, 446, k sample memory elements 445, 446 in order to obtain output signals for vertical and horizontal motions with respect to a K×3 window.

Accordingly, outputs of dividing elements 441, 442 are divided into vertical motion vector dy and horizontal motion vector dx for estimating vertical and horizontal motions. That is, dx and dy can be expressed as below respectively.

$$dx = \frac{\Sigma(\text{frame difference signal}) \times \text{sign (horizontal difference signals)}}{\Sigma|\text{horizontal difference signals}|} \quad (1)$$

$$dy = \frac{\Sigma(\text{frame difference signals}) \times \text{sign (vertical difference signals)}}{\Sigma|\text{vertical difference signals}|} \quad (2)$$

The above formulas (1) and (2) are derived as follows.

$$FD(x,y) = S_k(x,y) - S_{k-1}(x,y)$$
$$= S_k(x,y) - S_k(x + dx, y + dy)$$

-continued $$= \frac{\partial S_k(x,y)}{\partial x} dx - \frac{\partial S_k(x,y)}{\partial y} dy - n(x,y)$$

$$= -D^T \nabla_k{}^S(x,y) - n(x,y)$$

Here, dx and dy are respectively expressed when linear regression and cross term of x,y are ignored.

$$dx = \frac{E[FD(x,y) \cdot \partial S_k(x,y)/\partial x]}{E[(\partial S_k(x,y)/\partial X)^2]}$$

$$= \frac{\Sigma(\text{frame difference signals} \times \text{horizontal difference signals})}{\Sigma(\text{horizontal difference signals})^2}$$

$$= \frac{\Sigma(\text{frame difference signals}) \times \text{sign (horizontal difference signals)}}{\Sigma|\text{horizontal difference signals}|}$$

$$dy = \frac{E[FD(x,y) \cdot \partial S_k(x,y)/\partial y]}{E[\partial S_k(x,y)/\partial y)^2]}$$

$$= \frac{\Sigma(\text{frame difference signals} \times \text{vertical difference signals})}{\Sigma(\text{vertical difference signals})^2}$$

$$= \frac{\Sigma(\text{frame difference signals}) \times \text{sign (vertical difference signals)}}{\Sigma|\text{vertical difference signals}|}$$

The present invention with such motion detection, motion direction detection and motion estimation can be used for a signal processing such as scan line interpolation and field rate increase; and enhancement by using a function of motion direction detection of the present invention.

And also, the present invention with motion detection, motion direction detection and motion estimation can be used for separation of luminance and chromaticity, video data compression and so on.

As above mentioned in detail, conventional motion detection apparatus which uses only frame difference signals are under the influence of horizontal and vertical change rates of an image. The motion detection apparatus of the present invention can perform more accurate motion detection than prior art since horizontal and vertical image motion rates are taken into account. The present invention detects article motion direction through a function of its motion direction detection, whereas a motion detection apparatus of prior art has not a function of motion direction detection.

The present invention also provides measurement of a motion magnitude, whereas conventional motion detection apparatus just judges whether or not a motion exists.

And the motion estimation apparatus of the present invention provides a simple method which motion estimation can be done in a K×3 search region. There exists effects in that expanded search region in the horizontal direction can be obtained with increased k sample memory element number and expanded search region in the vertical direction can be obtained with increased line memory elements number.

What is claimed is:

1. Motion detection apparatus, comprising:

motion region detection means for comparing absolute values of horizontal and vertical difference signal sums with respect to repective incoming signals and 1 frame-delayed signals and certain critical values with frame difference signals in order to detect a motion region;

motion direction detection means for performig an exclusive OR of frame difference signal sign bits and sum signal sign bits of horizontal and vertical difference signals with respect to respective incoming signals and 1 frame-delayed signals in order to detect left/right motion direction and up/down motion direction; and motion magnitude detection means for detecting a horizontal motion magnitude and a vertical motion magnitude by ratios of frame difference signal absolute value sums and horizontal/vertical difference signal absolute value sums.

2. Motion detection apparatus as claimed in claim 1, wherein the in motion dection signals of the motion region detection means and left/light/up/down motion direction detection signals of the motion direction detection means are ANDed so that information on horizontal/vertical signals is obtained through the motion magnitude detection means.

3. Motion detection apparatus, comprising;

motion region detection means for comparing absolute values of horizontal and vertical difference signal sums with respect to respective incoming signals and 1 frame-delayed signals and certain critical values with frame difference signals in order to detect a motion region, wherein the motion region detection means includes, an interframe vertical difference signal absolute value generating section for converting vertical difference signal sums with respect to incoming image signals and 1 frame-delayed image signals to absolute values;

an interframe horizontal difference signal absolute value generating section for converting horizontal diffierence signal sums with respect to incoming image signals and 1 frame-delayed image signals to absolute values;

a frame difference signal absolute value generating section for obtaining frame difference signals with respect to incoming image signals and converting them to absolute values; and a motion region judging section for comparing the frame difference signal absolute value with certain critical values, and comparing the frame difference signal absolute values with horizontal/vertical difference signal sum absolute values, in order to judge whether or not motions exist;

motion direction detection means for performing an exclusive OR of frame difference signal sign bits and sum signal sign bits of horizontal and vertical difference with respect to respective incoming signals and 1 frame-delayed signals in order to detect left-right motion direction and up/down motion direction; and motion magnitude detection means for detecting a horizontal motion magnitude and a vertical motion magnitude by ratios of frame difference signal absolute value sums and horizontal/vertical difference signal absolute value sums.

4. Motion detection apparatus as claimed in claim 3, wherein the interframe vertical difference signal absolute value generating section comprises:

a 1st vertical difference signal generating element for generating vertical difference signals with respect to incoming image signals;

a 2nd vertical difference signal generating element for generating vertical difference signals with respect to incoming 1 frame-delayed signals;

an adding element for adding signals from the 1st and 2nd vertical difference signal generating elements; and an absolute value generating element for generating absolute values of the added signals.

5. Motion detection apparatus as claimed in claim 3, wherein the interframe horizontal difference signal absolute value generating section comprises:

a 1st horizontal difference signal generating element for generating horizontal difference signals with respect to incoming image signals;

a 2nd horizontal difference signal geerating element for generating horizontal difference signals with respect to incoming 1 frame-delayed signals;

an adding element for adding signals from the 1st and 2nd horizontal difference signal generating elements; and an absolute value generating element for generating absolute values of the added signals.

6. Motion detection apparatus as claimed in claim 3, wherein the motion region judging section comprises;

1st comparing element for comparing outputs of the frame difference signal absolute value generating section with certain critical values;

a 2nd comparing element for comparing the frame difference signal absolute values with outputs of the interframe vertical difference signal absolute value generating section;

a 3rd comparating element for comparing outputs of the interframe horizontal difference signal absolute value generating section with outputs of the frame difference signal absolute value generating section; and an OR gate element for performing a logic sum of outputs of the 1st, 2nd and 3rd comparating elements in order to detect a motion region.

7. Motion detection apparatus, comprising;

motion region detection means for comparing absolute values of horizontal and vertical difference signal sums with respect to respective incoming signals and 1 frame-delayed signals and certain critical values with frame difference signals in order to detect a motion region, motion direction means for performing an exclusive OR of frame difference signal sign bits and sum signal sign bits of horizontal and vertical difference signals with respect to respective incoming signals and 1 frame-delayed signals in order to detect left-right motion direction and up/down motin direction; wherein the motion direction detection means includes:

an interframe vertical difference signal generating section for adding vertical difference signals with respect to respective incoming image signals and 1 frame-delayed image signals;

an interframe horizontal difference signal generating section for adding horizontal difference signals with respect to respective incoming image signals and 1 frame-delayed image signals;

a frame difference signal generating section for generating frame difference signals with respect to incoming image signals;

a motion direction judging section for performing an exclusive OR with respect to signals from the frame difference signal generating section, interframe vertical difference signal generating section and interframe horizontal difference signal generating section in order to detect whether or not motions in up, down, left and right directions exist; and motion magnitude means for detecting a horizontal motion magnitude and a vertical motion magnitude by ratios of frame difference signal absolute value sums and horizontal/vertical difference signal absolute value sums.

8. Motion detection apparatus as claimed in claim 7, wherein the interframe vertical difference signal generating section comprises:

a 1st vertical difference signal generating element for generating vertical difference signals with respect to incoming image signals;

a 2nd vertical difference signal generating element for generating vertical difference signals with respect to 1 frame-delayed signals;

an adding element for adding signals from the 1st and 2nd vertical difference signal generating elements.

9. Motion detection apparatus as claimed in claim 7, wherein the interframe horizontal difference signal generating section comprises:

a 1st horizontal differnce signal generating element for generating horizontal difference signals with respect to incoming image signals;

a 2nd horizontal difference signal generating element for generating horizontal difference signals with respect to 1 frame-delayed signals;

an adding element for adding signals from the 1st and 2nd horizontal difference signal generating elements.

10. Motion detection apparatus as claimed in claim 7, wherein the motion direction judging section comprises:

an exclusive OR gate element for performing an exclusive OR with respect to signals from the frame difference signal generating section and the interframe horizontal difference signal generating section in order to judge whether or not motion in left right directions exist; and an exclusive OR gate element for performing an exclusive OR with respect to signals from the frame difference signal generating section and the interframe horizontal difference signal generating section in order to judge whether or not motions in up and down directions exits.

11. Motion detection apparatus, comprising:

motion region detection means for comparing absolute values of horizontal and vertical difference signal sums with respect to respective incoming signals and 1 frame-delayed signals and certain critical values with frame difference signals in order to detect a motion region, motion direction detection means for performing an exclusive OR of frame difference signal sign bits and sum signal sign bits of horizontal and vertical difference signals with respect to respective incoming signals and 1 frame-delayed signals in order to detect left-right motion direction and up/down motion direction;

motion magnitude detection means for detecting a horizontal motion magnitude and a vertical motion magnitude by ratios of frame difference signal absolute value sums and horizontal/vertical difference signal absolute value sums; wherein the motion magnitude detection means includes:

a vertical difference signal absolute value generating section for generating vertical difference signal absolute values with respect to 1 line-delayed signals and 2 line-delayed signals with respect to incoming image signals and add the absolute values;

a horizontal difference signal absolute value generating section for generating horizontal difference signal absolute values with respect to incoming image signals, 1 sample-delayed signals and 2 line-delayed signals respectively with respect to the incoming image signals;

a frame difference signal generating section for obtaining frame difference signals with respect to incoming image signals, 1 line-delayed signals and 2 line-delayed signals respectively with respect to the incoming image signals;

a motion magnitude calculating section for detecting motion magnitudes by a ratio of vertical difference signal absolute value accumulation signals with respect to a K×2 window, horizontal difference signal absolute value accumulation signals with respect to a K×3 window and frame difference signal absolute value accumulation signals when signals come in from the vertical difference signal absolute value section, horizontal difference signal absolute value generating section and frame difference signal generating section.

12. Motion detection apparatus as claimed in claim 11, wherein the vertical difference signal absolute value generating section comprises:

a 1st vertical difference signal absolute value generating element for generating vertical difference signal absolute values with respect to incoming image signals;

a 2nd vertical difference signal absolute value generating element for generating vertical difference signal absolute values with respect to 1 line-delayed signals of incoming image signals; and an adding element for adding outputs of the 1st and 2nd vertical difference signal absolute value generating elements.

13. Motion detection apparatus as claimed in claim 11, wherein the horizontal difference signal absolute value generating section comprises:

a 1st horizontal difference signal absolute value generating element for generating horizontal difference signal absolute values with respect to incoming image signals;

a 2nd horizontal differnce signal absolute value generating element for generating horizontal difference signal absolute values with respect to 1 line-delayed signals of incoming image signals;

a 3rd horizontal difference signal absolute value generating element for generating horizontal difference signal absolute values with respect to 2 line-delayed signals of incoming image signals; and an adding element for adding outputs of the 1st, 2nd and 3rd horizontal difference signal absolute value generating elements and generating the added signals to the motion magnitude calculating section.

14. Motion detection apparatus as claimed in claim 11, wherein the frame difference signal generating section comprises:

a frame difference signal absolute value generating element for generating 1 frame difference signal absolute values with respect to incoming image signals;

a 1st interframe vertical difference signal absolute value generating element for generating differences between 1 line-delayed signals and 1 frame/1 line-delayed signals respectively with respect to incoming image signals and obtains absolute values of the differences;

a 2nd interframe vertical difference signal absolute value generating element for generating differences between 2 line-delayed signals and 1 frame/2 line-delayed signals respectively with respect to incoming image signals and generates absolute values of the differences; and an adding element for adding outputs of the frame difference signal absolute value generating element, 1st and 2nd interframe vertical difference signal absolute value generators as its output.

15. Motion detection apparatus as claimed in claim 11, wherein the motion magnitude calculating section comprises:

a 1st sample accumulating element for accumulating outputs of the vertical difference signal absolute value generating section by k samples as its outputs;

a 2nd sample accumulating element for accumulating outputs of the horizontal difference signal absolute value generating section by k samples as its output;

a 3rd sample accumulating element for accumulating outputs of the frame difference signal generating section by k samples as its output; and a dividing element for dividing outputs of the 2nd sample accumulating element by outputs of the 3rd sample accumulating in order to detect horizontal motion magnitudes; and a dividing element for dividing outputs of the 1st sample accumulating element by outputs of the 3rd sample accumulating element in 227 order to detect vertical motion magnitudes.

16. Motion detection method comprising:

a motion region detection step which compares absolute values respective input signals and horizontal and vertical difference signal sums with respect to 1 frame-delayed signals and certain critical values with frame difference signals in order to detect a motion region;

a motion direction detection step which performs an exclusive of frame difference signal sign bits and sum signal sign bits of horizontal and vertical difference signals with respect to respective input signals and 1 frame-delayed signals in order to detect left/right motion direction and up/down motion direction; and a motion magnitude detection steps which detects a horizontal motion magnitude with regard to a K×3 window and a vertical motion magnitude with regard to a K×2 window by a ratio of frame difference signal absolute value sums and horizontal/vertical difference signal absolute value sums.

17. Motion detection mehtod as claimed in claim 16, wherein the motion region detection steps comprise:

step A which generates vertical difference signals with respect to incoming signals and 1 frame-delayed signals of it respectively, adds the 2 vertical difference signals and generates absolute values of the added values;

step B which generates horizontal difference signals with respect to incoming signals and 1 frame-delayed signals of it respectively, adds the 2 horizontal difference signals and generates absolute values of the added values;

step C which obtains frame difference signals with respect to incoming image signals and converts then to absolute values; and step D which compares outputs of the step C with certain critical values, compares outputs of the step C with those of the step A, compares output of the step B with those of the step A and ORs the compared outputs.

18. Motion detection method as claimed in claim 16, wherein the motion direction detection steps comprise:

step A which generates vertical difference signals with respect to incoming signals and 1 frame-delayed signals of it respectively and adds the 2 vertical difference signals;

step B which gnerates horizontal difference signals with respect to incoming signals and 1 frame-delayed signals of it respectively and adds the 2 horizontal difference signals;

step C which obtains frame difference signals with respect to incoming image signals; and step D which performs an exclusive OR with respect to outputs of the step C and those of the step B in order to detect a left/right motion and performs an exclusive OR with respect to outputs of the step C and those of the step A in order to detect and up/down motion.

19. Motion detection mehtod as claimed in claim 16, wherein the motion magnitude detection steps comprise:

step A which generates vertical difference signal absolute values with respect to incoming signals and 1 frame-delayed signals of it respectively and adds outputs of the 2 vertical difference signal absolute values;

step B which generates horizontal difference signal absolute values with respect to incoming signals, 1 line-delayed signals and 2 line-delayed signals of it respectively and adds the 3 horizontal difference signal absolute values;

step C which generates 1 frame difference signal absolute values with respect to incoming image signals, generates difference signals between 1 line-delayed signals and 1 frame/1 line-delayed signals with repect to the incoming image signals respectively, obtains the difference signal absolute values, generates difference signals between 2 line-delayed signals and 1 frame/2 line-delayed signals with respect to the incoming image signals, obtains differene signal absolute values and generates sum signals of the frame difference signal absolute values, the 1st interframe vertical difference signal absolute values and the 2nd interframe vertical difference signal absolute values; and step D which detects horizontal and vertical motion magnitudes comprises substeps of:
substep d1 which accumuates outputs of the step A by k samples;
substep d2 which accumuates outputs of the step B by k samples;
substep d3 which accumuates outputs of the step C by k samples; and
substep d4 which divides outputs of the substep d2 by outputs of substep d3 in order to detect horizontal motion magnitudes and divides outputs of the substep d1 by outputs of the substep d3 in order to detect vertical motion magnitudes.

20. Motion estimation apparatus, comprising:
a vertical difference estimation absolute value generating means for generating vertical difference signal absolute values with respect to incoming image signals, 1 line-delayed signals and 2 line-delayed signals of the incoming image signals and adding the absolute values;

a horizontal difference estimation signal absolute value generating means for generating horizontal difference signal absolute values with respect to incoming image signals, 1 line-delayed signals and 2 line-delayed signals and adding the absolute values;

a frame difference correction signal generating means for generating difference signals with respect to incoming image signals, 1 frame/1 line-delayed signals and 1 frame/2 line-delayed signals of the incoming image signals;

an estimation signal complement generating means for checking sign bits of output signals from the vertical difference estimation signal absolute value generating means, horizontal difference estimation signal absolute value generating means and frame difference correction signal generating means; and an estimation value calculating means for accumulating input signals from the vertical difference estimation signal absolute value generating means, horizontal difference estimation signal absolute value generating means and frame difference correction signal generating means by k samples with respect to a K×3 window in order for motion detection.

21. Motion estimation apparatus as claimed in claim 20, wherein the vertical difference estimation signal absolute value generating means comprises:
a 1st vertical difference signal absolute value generating section for generating vertical difference signal absolute values with respect to incoming image signals;
a 2nd vertical difference signal absolute value generating section for generating vertical difference signal absolute values with respect to 1 line-delayed signals of the incoming image signals;
a 3rd vertical difference signal absolute value generating section for generating vertical difference signal absolute values with respect to 2 line-delayed signals of the incoming image signals; and
an adding element for adding the 1st, 2nd and 3rd vertical difference signal absolute values.

22. Motion estimation apparatus as claimed in claim 20, wherein the horizontal difference estimation signal absolute value generating means comprises:
a 1st horizontal difference signal absolute value generating section for generating horizontal difference signal absolute values with respect to incoming image signals;
a 2nd horizontal difference signal absolute value generating section for generating horizontal difference signal absolute values with respect to 1 line-delayed signals of the incoming image signals;
a 3rd horizontal difference signal absolute value generating section for generating horizontal difference signal absolute values with respect to 2 line-delayed signals of incoming image signals; and
an adding element for adding horizontal difference signal absolute values from the 1st, 2nd and 3rd horizontal difference signal absolute value generating sections.

23. Motion estimation apparatus as claimed in claim 20, wherein the frame difference correction signal generating means comprises:
a frame difference signal absolute value generating section for generating 1 frame difference signal absolute value with respect to incoming image signals;
a 1st interframe vertical difference signal generating section for generating differences between 1 line-delayed signals and 1 frame/1 line-delayed signals with respect to the incoming image signals;
a 2nd interframe vertical difference signal generating section for generating differences between 2 line-delayed signals and 1 frame/2 line-delayed signals with respect to the incoming image signals and obtains absolute values of the differences.

24. Motion estimation apparatus as claimed in claim 20, wherein the estimation value calculating means comprises:
a 1st sample accumulating section for generating its outputs after accumulating signals from the vertical difference estimation signal absolute value generating means by k samples;
a 2sample accumulating section for generating its outputs after accumulating signals from the horizontal difference estimation signal absolute value generating means by k samples;
a 3rd sample accumulating section for generating its outputs after accumulating sums of multiplication signals of vertical difference signal signs and frame difference signals by k samples;

a 4th sample accumulating section for generating its outputs after accumulating sums of multiplication signals of horizontal difference signal signs and frame difference signals by k samples;

a dividing element for estimating a vertical motion by a ratio of sums of multiplications of frame difference signals and vertical difference signal signs from the 3rd sample accumulating section and sums of vertical difference signal absolute values from the 1st sample accumulating section; and a dividing element for estimaqting a horizontal motion by a ratio of sums of multiplications of frame difference signals and horizontal difference signal signs from the 4th sample accumulating section and sums of horizontal difference signal absolute values from the 2nd sample accumulating section.

25. Motion estimation apparatus as claimed in claim 20, wherein the estimation signal complement generating means comprises:

a 1st complement generating section for generating sign bits of the 1st horizontal difference signals and the 1st vertical difference signals;

a 2nd complement generating section for generating sign bits of the 2nd horizontal difference signals and the 2nd vertical difference signals;

a 3rd complement generating section for generating sign bits of the 3rd horizontal difference signals and the 3rd vertical difference signals; and adding elements for adding outputs from the 1st, 2nd and 3rd complement generating sections.

26. Motion estimation apparatus as claimed in claim 25, wherein the 1st, 2nd and 3rd complement generating sections respectively comprise:

an inverting element for inverting the horizontal difference signal signs;

a 1st complement generating element for generating complements according to outputs of the inverting element and the frame difference signals;

an inverting element for inverting the vertical difference signal signs; and a 2nd complement generating element for generating complements according to outputs of the inverting element and the frame difference signals.

27. Motion estimation method comprises:

step A which consists of
substep a1 generating vertical difference signal absolute values with respect to incoming image signals;
substep a2 generating vertical difference signal absolute values with respect to 1 line-delayed signals of the incoming image signals;
substep a3 generating vertical difference signal absolute values with respect to 2 line-delayed signals of the incoming image signals; and
substep a4 adding the vertical difference signal absolute values of the substeps a1, a2, a3;

step B which consists of
substep b1 generating horizontal difference signal absolute values with respect to incoming image signals;
substep b2 generating horizontal difference signal absolute values with respect to 1 line-delayed signals of the incoming image signals;
substep b3 generating horizontal difference signal absolute values with respect to 2 line-delayed signals of the incoming image signals; and
sibstep a4 adding the horizontal difference signal absolute values of the substeps b1, b2, b3;

step C which generates 1 frame difference signal absolute values with respect to incoming image signals, generates difference signals between 1 line-delayed signals and 1 frame/1 line-delayed signals with respect to the incoming image signals respectively and generates absolute values of difference signals between 2 line-delayed signals and 1 frame/2 line-delayed signals with respect to the incoming image signals;

step D which generates sign bits of substeps a1, a2, sign bits of substeps a2, b2 and sign bits of substeps a3, b3 and adds output signal sign bit values;

step E which estimates horizontal and vertical motions, consisting of
substep e1 which generates its outputs after accumulating output signals of the step A by k samples;
substep e2 which generates its outputs after accumulating output signals of the step B by k samples;
substep e3 which generates its outputs after accumulating sums of mutiplications of frame difference signals and vertical difference signal signs of the substep e1 by k samples;
substep e4 which generates its outputs after accumulating sums of mutiplications of frame difference signals and horzontal difference signal signs of the substep e2 by k samples; and
substep e5 which estimates a vertical motion by a ratio of sums of multiplications of frame difference signals and vertical difference signal signs from the substep e3 and sums of vertical difference signal absolute values from the substep e1, and estimates a horizontal motion by a ration of sums of multiplications of frame difference signals and horizontal difference signal signs from the substep e4 and sums of vertical difference signal absolute values from the substep e2.

* * * * *